(12) United States Patent
Bruce et al.

(10) Patent No.: US 6,370,307 B1
(45) Date of Patent: Apr. 9, 2002

(54) OPTICAL DEVICE FORMED ON A SUBSTRATE WITH THERMAL ISOLATION REGIONS FORMED THEREIN

(75) Inventors: Allan James Bruce, Scotch Plains; Alexei Glebov, New Providence; Joseph Shmulovich, Murray Hill, all of NJ (US); Ya-Hong Xie, Beverly Hills, CA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/354,406

(22) Filed: Jul. 15, 1999

(51) Int. Cl.$^7$ .................................................. G02B 6/10
(52) U.S. Cl. ........................ 385/130; 385/49; 385/141
(58) Field of Search .................... 385/129, 130, 385/131, 132, 141, 37, 49

(56) References Cited

U.S. PATENT DOCUMENTS

| | | | | |
|---|---|---|---|---|
| 4,680,963 A | * | 7/1987 | Tabata et al. ................... | 73/204 |
| 5,696,629 A | * | 12/1997 | Berger et al. ................. | 359/582 |
| 5,712,937 A | * | 1/1998 | Asawa et al. .................. | 385/49 |
| 5,736,749 A | * | 4/1998 | Xie ................................. | 257/3 |
| 5,767,561 A | * | 6/1998 | Frei et al. ..................... | 257/499 |

FOREIGN PATENT DOCUMENTS

| | | | |
|---|---|---|---|
| JP | 09211240 | 1/1996 | ............ G02B/6/12 |

OTHER PUBLICATIONS

Gesele, G. et al., *Phys. D. Appl. Phys.*, "Temperature–Dependent Thermal Conductivity Of Porous Silicon", vol. 30, No. 21, pp. 2911–2916, Nov. 1997.

Dieckroger, J. et al., *IEEE Photonics Technology Letters*, "Thermooptically Tunable Optical Phased Array In $SiO_2$–Si", vol. No. 2, pp. 248–250, Feb. 1999.

Fischer, U. et al., *Electronics Letters*, "Singlemode Optical Switches Based On SOI Waveguides With Large Cross–Section", vol. 30, No. 5, pp. 406–408, Mar. 3, 1994.

Henry, C.H., et al., "Silica based optical integrated circuits," IEE Proc. Optoelectron, vol. 143, No. 5, pp. 263–280 (1996).

Gesele, G. et al., J. Phys. D: Appl. Phys., Temperature–dependent thermal conductivity of porous silicon, vol. 30, pp. 2911–2916 (1997).

Lang, W. et al., Sensors and Actuators, Porous silicon: a novel material for microsystems, A 51, pp. 31–36, 1995.

Unagmi et al., Semiconductor Technologies, An Isolation Technique Using Oxidized Porous Silicon, vol. 8, Chapter 11, pp. 139–154.

\* cited by examiner

Primary Examiner—Cassandra Spyrou
Assistant Examiner—Euncha Cherry
(74) Attorney, Agent, or Firm—Richard J. Botos

(57) ABSTRACT

An optical device that is a waveguide with a heating element thereon that is formed on a silicon substrate is disclosed. The waveguide is formed on a region of porous silicon formed in the silicon substrate. The porous silicon region provides greater resistance to the flow of heat than the silicon substrate on which the device is formed. Optionally, the porous silicon region also provides greater resistance to the flow of heat than the waveguide.

7 Claims, 1 Drawing Sheet

OPTICAL DEVICE FORMED ON A SUBSTRATE WITH THERMAL ISOLATION REGIONS FORMED THEREIN

BACKGROUND OF THE INVENTION

1. Technical Field

The present invention relates to optical devices, and in particular, optical waveguides that are coupled with heaters.

2. Art Background

Optical fiber communication systems are becoming more prevalent. In addition to the optical fiber itself, optical fiber communication systems use a wide variety of optical devices for receiving, transmitting, and using optical signals. One type of integrated optical device is a silica optical circuit formed on silicon substrates. The basic structure of such device is described in Henry, C. H., et al., "Silica-based optical integrated circuits," IEE *Proc.-Optoelectron*, Vol. 143, No. 5, pp. 263–280 (1996).

In certain optical devices such as thermo-optic switches, heaters are used to effect a change in the refractive index of the device. The change in refractive index of the device changes the phase of the signal transmitted through the device. Using a heater to effect a controlled change in the refractive index of the optical device is a way to effect a controlled change in the phase of the transmitted optical signal. Inducing a controlled phase change in an optical signal is useful in a variety of contexts. In some devices a controlled phase change is induced to tune the optical device. In other devices, a controlled phase change is used as a switching mechanism.

Examples of thermo-optic switches include the N×N optical switch and the add/drop multiplexer. In thermo-optic switches, a thin film heater is formed on the optical device, which is typically a planar waveguide. The planar waveguide consists of a first cladding layer formed on a substrate. The core is formed on the first cladding layer. A second cladding layer is then formed over the core. A thin film heater is then formed on the second cladding layer. The thin film heater is used to effect a desired change in the refractive index of the core and claddings for device operation.

To produce the desired phase change in the device, the temperature of the waveguide is increased. However, the waveguide is in intimate contact with the silicon substrate, which is a good thermal conductor. Consequently, unless the silicon substrate is thermally isolated from the waveguide, it is difficult to effect a local change in waveguide temperature and the power consumed by the heater will be high.

Many devices, such as Mach-Zehnder waveguide interference devices, have multiple branches or arms that must be independently heated to effect the desired device operation. For example, in the two-arm Mach-Zehnder devices, one arm is heated and the other arm is not to produce a desired differential phase change between the signals from each arm. Since silicon is a good thermal conductor, silicon facilitates temperature equilibration between the heated arm and the unheated arm, which is undesirable. Consequently, there have been attempts to thermally isolate the arms of a silicon-based planar Mach-Zehnder device from each other.

In one approach, trenches are etched out under the waveguides to thermally isolate the waveguides from the substrate. However, the trenches increase the amount of time for the device to cool and thus the amount of time it takes for the device to switch back to its unswitched state (the switched state being the heated state). Another disadvantage of the trench approach is the complexity of manufacturing involved in extra steps.

Accordingly, ways to control the heat flow from a heated waveguide that is conducted by the substrate are sought.

SUMMARY OF THE INVENTION

The present invention is directed to an optical device in which heat is used to thermally induce a desired change in the refractive index of the device. The device is a waveguide that is formed on a region of porous silicon that is formed in a silicon substrate. The porous silicon region has a thermal conductivity that is less than the heat conductivity of silicon oxide. Consequently, less heat is conducted from a heated waveguide formed on a porous silicon region that would otherwise be conducted if the heated waveguide were formed on either silicon or silicon oxide.

The optical device is fabricated by first forming at least one region of porous silicon in a silicon substrate. Expedients for forming regions of porous silicon in a substrate are well known to one skilled in the art. It is advantageous if the porous silicon is formed using an electrolytic process. In the electrolytic process, silicon is anodized in an electrolytic solution. Such a technique is described in Unagmi, T., et al., "An Isolation Technique Using Oxidized Porous Silicon," Semiconductor *Technologies,* Vol. 8, Chap. 11, pp. 139–154 (OHMSHAT and North Holland Publishing Company 1983) which is hereby incorporated by reference.

The silicon substrate is anodized selectively to form porous silicon regions therein. The substrate is selectively anodized by forming a mask on the silicon substrate prior to anodization. The mask has at least one opening therein. The underlying silicon substrate surface is exposed through such openings.

Similarly the porosity of the porous silicon region is also largely a matte of design choice. The porosity of the material is controlled by the doping level of the substrate (e.g. silicon wafer) and the anodization condition used to form the porous areas. Anodization conditions such as an applied voltage and the associated current density as well as the concentration and pH values of the HF solutions are selected to obtain the desired porosity. The range of appropriate porosities is mainly determined by two factors: low heat conductivity and mechanical stability. The porous silicon must be porous enough to have heat conductivity lower than that of silicon oxide (1.4 W/m K). In this regard, it is advantageous if the porosity is at least about 50 volume percent. In principle, the higher the porosity is, the lower is the heat conductivity (G. Gesele, G, et al., *J. Phys. D: Appl. Phys.,* Vol. 30, pp. 2911–2916 (1997). Therefore, higher porosity is advantageous because it provides lower heat conductivity. In certain embodiments, the porous silicon need only withstand the rigors of subsequent processing. In these embodiments, porosities up to about ninety-five percent are suitable. In other embodiments where the structural demands on the porous silicon are more rigorous, porosities of up to ninety percent are contemplated. This is because thick (i.e. greater than about 5 $\mu$m) porous layers are brittle and do not provide the required support for the optical device formed thereon.

The dimensions of the porous silicon region are largely a matter of design choice. The depth and size of a porous silicon region depends upon the size of the waveguide subsequently formed on the region and the amount of heat generated by the heater on such device. Since the objective is to stem the heat conducted from the heated waveguide into the substrate, the larger the amount of heat generated by the waveguide, the greater the resistance to thermal conductivity that must be provided by the porous silicon region. As previously noted, one way to increase the porous silicon's resistance to thermal conductivity is to increase its porosity. Another way is to increase the distance heat must travel through the porous silicon region (i.e., the thickness of the porous silicon region) to the substrate.

After the porous silicon region is formed on the substrate, the optical device is completed. Examples of devices that would benefit from being formed on porous silicon include Wavelength Add-Drop (WAD) for Dense Wavelength Division Multiplexing (DWDM) systems, dynamic wavelength equalizers for chromatic equalization in Er-doped fiber amplifier systems; Mach-Zehnder (MZ) based switches, tunable filters, and Y-branch switches. The thickness and porosity of the porous silicon region are selected to balance the efficiency of the device (i.e., the amount of heat needed to switch) and the speed of the device. The better the insulation of the element from the silicon substrate (which functions as a heat sink) the longer it takes for the heat to dissipate from the heated portion of the device, and the lower the frequency of the operation.

Furthermore, the processes used to form the waveguide on the porous silicon region must be compatible with the porous silicon process. This means that the process for forming the claddings and cores of the devices on the porous silicon can not require conditions that would damage the porous silicon region. For examples, the temperature range in which the claddings and cores are deposited on the porous silicon region cannot include temperatures that will cause the porous layer to disintegrate. Forming the cores and claddings on a porous silicon regions using a standard low-pressure chemical vapor deposition (LPCVD) technique does not unacceptably damage the porous silicon.

DETAILED DESCRIPTION

Figure 1:
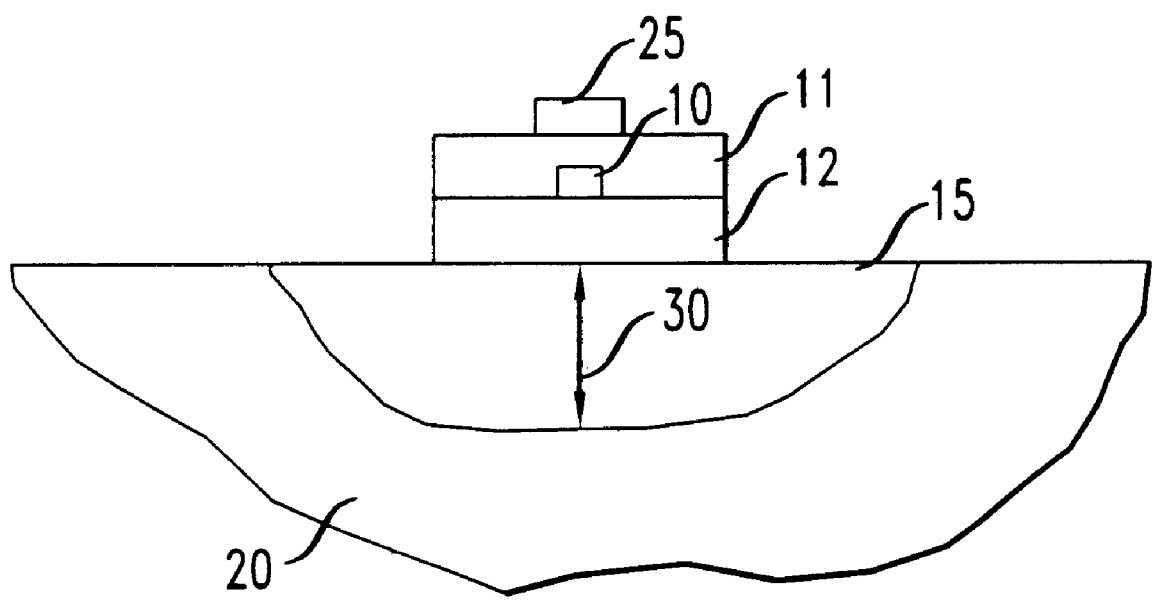
FIG. 1 illustrates an example optical device formed on a region of porous silicon.

The present invention is directed to an optical device that includes a waveguide with a heat-generating element that is formed on a porous silicon region of a silicon substrate. The porous silicon restricts the flow of heat from the heated device. Consequently, the rate at which heat flows from the heat-generating element into the silicon substrate is reduced by the porous silicon region. Since heat flows from the heater at a reduced rate than it otherwise would if the waveguide were formed directly on a silicon substrate, the temperature of the waveguide increases at a faster rate than it otherwise would without a commensurate increase in power consumption by the heater.

A variety of optical devices have a heat-generating element (e.g. a thin film heater), which is used to effect a desired response in the device. Such devices are well known to one skilled in the art and are not described in detail herein. Examples of devices that have heaters disposed on top of waveguides include MZ interferometers. In MZ interferometers, heating one arm of the device without heating the other arm produces a phase difference between the optical signals transmitted in the two arms of the device. Heating the arm changes its refractive index. The change in refractive index increases or decreases the phase delay of the propagating light signal in the heated arm. MZ interferometers are incorporated into other devices, such as add-drop filters and gain equalizers. In an add-drop filter, a built-in MZ is used to pass or switch a channel to another arm. In a gain equalizer, the heater controls the phase shift between the signals propagating in the arms of the device and therefore the amount of light propagating in each of them.

FIG. 1 illustrates the general structure of a planar waveguide with a thin film heater formed thereon. It consists of three layers: core layer 10; upper clad layer 11; and lower clad 12. In one embodiment, all three layers are silica glass. In alternative embodiments, the layers are plastic. The core layer is doped with phosphorus. The thickness of the individual layers is a matter of design choice. The appropriate thicknesses for a particular application are readily ascertained by one skilled in the art.

The waveguide is formed on a region of porous silicon 15 formed in a silicon substrate 20. The region of porous silicon is formed by depositing a patterned layer of material that defines the desired porous silicon regions by leaving those regions exposed through the mask. The mask material is deposited on the substrate and then patterned. The masked substrate is then placed in an annodization bath. The portions of the substrate that are exposed to the anodization bath are converted to porous silicon, and the regions covered by the mask are not.

A variety of mask materials are contemplated as suitable. Examples of suitable mask materials include photoresist, nitride, oxide, and carbide of silicon, polysilicon, and metals that are not soluble in HF solutions (e.g., gold, platinum etc.). Different masking materials have different etch-resistances for HF and thus should be chosen according to desired etch time and the process complexity.

After the region of porous silicon is formed on the substrate, a planar waveguide, as described above, is formed on the porous silicon region. A thin film heater 25 is formed on the upper cladding layer 11 of the planar waveguide.

EXAMPLE

Silicon wafers doped with a resistivity of 0.01 Ω-cm were cleaned and coated with an energy sensitive resist material, Shipley 1822 that was obtained from the Shipley Co. of Marlborough, Mass. The layer of energy sensitive material was formed on the silicon substrate using standard conditions.

A pattern was delineated into the energy sensitive material. The pattern was a series of lines and spaces wherein the lines had a thickness of 35 $\mu$m and a length of 2.8 mm. The lines had a centerline to centerline distance of 175 $\mu$m. The pattern was delineated in the energy sensitive resist material using standard lithographic techniques. First, an image was transferred into the energy sensitive material by exposing the resist to patterned radiation. The image was then developed into a pattern by removing the portions of the energy sensitive material that were exposed to radiation. Removing portions of the energy sensitive material exposed the surface of the silicon substrate underlying those portions. The dimensions of the removed portions corresponded to the dimensions of the lines in pattern. In this embodiment the same mask that was used to define the regions of porous silicon was used as the mask to form the heaters on the waveguides.

After the pattern was developed, the resist was baked at 150° C. for 2 minutes. This was done to increase the stability of the resist during subsequent processing.

The substrate with the patterned masking layer thereon was then subjected to a set of conditions that electrochemically etches silicon. The electrochemical cell used here was a standard double-tank cell. A cell of this type is described in Lang, W. et al., *Sensors and Actuators* A 51, pp. 31–36 (1995). In the double-tank cell the wafer was immersed in HF solution such that that both sides were immersed in solution and the wafer formed a barrier between two half-cells. Two platinum electrodes were located in each half-cell on both sides of the wafer. The electrical contact to the backside of the wafer was formed electrolytically, and the corresponding platinum electrode was the anode. The platinum electrode in the other half-cell was under cathodic potential. The two platinum electrodes were connected to the power supply that drives the current through the wafer. The front side of the wafer is anodically etched and porous silicon is formed at the areas not covered with the mask. The electrolyte was 35 weight percent ethanolic solution of hydrofluoric acid (HF). Several different current densities were used. A current density of 5 mA/cm$^2$ provided an etch rate of 0.3 $\mu$m/min and a porosity of about 70%. A current density of 40 mA/cm$^2$ provided an etch rate of 1.4 $\mu$m/min and a porosity of about 80%. After the porous layer of 5–10 $\mu$m thickness was formed the current was shut off and the substrate wafer was removed from the cell. The mask was stripped off of the substrate surface. The resist mask was removed in a bath of a standard organic resist stripper.

After the porous silicon region was formed in the substrate, the substrate was heated to 300° C. and held for two hours in an oxygen atmosphere. The substrate was then placed in an oxygen-containing atmosphere at 1000° C. for one hour. The porous silicon was oxidized but did not measurably expand in the vertical direction (line 30 is FIG. 1), i.e., it remained planar with the substrate surface. Because the porous silicon surface did not increase or decrease in elevation compared to the rest of the substrate surface, further processing was not complicated by the presence of the porous silicon region.

A layer of silica was then deposited on the substrate. The silica was deposited using low-pressure chemical vapor deposition (LPCVD). A silane precursor was used in the CVD process. The silica film had a thickness of about 15 $\mu$m. The silica layer was the bottom cladding of the optical device.

A layer of doped glass material was then deposited on the bottom cladding layer. The doped glass was silica doped with phosphorus (seven weight percent). The doped glass material was deposited using LPCVD. The dopants were introduced into the glass in situ.

The core of the optical device was then formed by patterning the doped glass layer. An etch mask layer was formed over the doped glass layer. The etch mask layer was then patterned, so that the remaining portion of the etch mask layer defined the core of the optical device being formed. The doped glass material was then etched using reactive ion etching (RIE). After etching, the portion of the doped glass layer that remains is the core of the optical device. The remaining portion of the RIE etch mask was then removed.

Another layer of silica glass is formed over the substrate. The layer of silica glass was deposited using LPCVD from tetraethyl orthosilicate (TEOS) precursors. The glass composition was silica doped with boron (five weight percent) and phosphorus (2 weight percent).

A thin film heater was then formed on the upper cladding layer. The thin film heater was formed by sputtering a layer of chromium on the upper cladding layer. The chromium layer had a thickness of the 200 nm. The heaters were defined lithographically in the chromium layer. A layer of energy sensitive resist material was formed on the chromium layer and patterned using conventional materials and expedients. The patterned resist material was then used as an etch mask to transfer the pattern into the underlying chromium layer.

After the heaters were formed on the upper cladding layer, the substrate was selectively etched to remove the silica glass between the individual waveguides. This is accomplished by masking the substrate and selectively etching the silica glass between the waveguides. The steps of masking and etching are conventional and not discussed in detail herein.

A metal contact was then formed on the heater. The metal contact was formed in about the middle of the heater by sputtering, sequentially, layers of titanium (100 nm), platinum (200 nm) and gold (500 nm) on the previously described structure. The layers were then patterned to form the electrically contacts for the chromium heaters previously formed on the substrate.

The invention has been described in terms of specific embodiments and examples. These embodiments and examples are provided to illustrate the invention and are not intended to limit the invention except as is consistent with the claims.

What is claimed is:

1. An optical device comprising:
   a region of porous silicon in a supporting silicon substrate;
   a waveguide formed on the region of porous silicon, the waveguide comprising a core, a cladding, and a heater formed on the cladding wherein the waveguide is formed substantially entirely on the region of porous silicon.

2. The optical device of claim 1 wherein the porous silicon region has a thermal resistivity that is greater than the thermal resistivity of the waveguide.

3. The optical device of claim 1 wherein the porous silicon region has a porosity that is greater than about fifty percent but less than about ninety-five percent.

4. The optical device of claim 1 wherein the porous silicon region has a porosity that is greater than about fifty percent but less than about ninety percent.

5. The optical device of claim 1 wherein the device is selected from the group consisting of wavelength add-drop (WAD) devices, dynamic wavelength equalizers, Mach-Zehnder interferometers, tunable filters, and Y-branch switches.

6. The optical device of claim 1 wherein the porous silicon region has a thermal resistivity that is less than the thermal resistivity of the waveguide.

7. The optical device of claim 6 wherein the waveguide is plastic.

* * * * *